United States Patent [19]

Gendron et al.

[11] Patent Number: 5,134,471
[45] Date of Patent: Jul. 28, 1992

[54] SYSTEM FOR MONITORING THE WALLS OF A BOREHOLE USING A VIDEO CAMERA

[75] Inventors: Alain Gendron, Ste-Catherine; Guy Chevrette, Saint-Laurent; Pierre Senecal, Montreal, all of Canada

[73] Assignee: Noranda Inc., Toronto, Canada

[21] Appl. No.: 696,146

[22] Filed: May 6, 1991

[51] Int. Cl.[5] .............................................. H04N 7/18
[52] U.S. Cl. ..................................... 358/100; 73/152; 364/422; 367/69
[58] Field of Search .................... 358/100, 99, 93, 229, 358/107, 209; 367/69, 71, 113, 115; 73/151, 152

[56] References Cited

U.S. PATENT DOCUMENTS

| | | | |
|---|---|---|---|
| 4,463,378 | 7/1984 | Rambow | 358/100 X |
| 4,774,573 | 9/1988 | Mount, II et al. | 358/100 X |
| 4,855,820 | 8/1989 | Barbour | 358/100 |

Primary Examiner—Victor R. Kostak
Attorney, Agent, or Firm—Fleit, Jacobson, Cohn, Price, Holman & Stern

[57] ABSTRACT

A borehole camera monitoring system comprises a camera head assembly adapted to be lowered into a borehole by means of a cable and control unit located above ground for generating a control signal for the operation of the camera. The camera head assembly comprises a fixed portion and a rotary portion containing the camera and associated equipment for examining the wall of the borehole. The fixed portion of the camera head assembly comprises a micro-controller for controlling the operation of the camera, a position encoder for detecting the angular rotation of the camera with respect to the fixed portion of the camera head assembly and a communication interface including means for multiplexing the video signal generated by the camera with an information signal generated by the micro-controller for transmission over the cable and means for extracting the control signal generated by the computer and transmitted over the cable. The control unit comprises, in addition to the above mentioned computer, a video monitor and a communication interface including means for extracting from the signal transmitted over the cable the video signal for the video monitor and the information signal for the computer and means for multiplexing the control signal of the computer for transmission over the cable. A depth counter is connected to the computer for detecting the depth of the camera head assembly from the upper edge of the borehole.

6 Claims, 4 Drawing Sheets

Fig. 1

SYSTEM FOR MONITORING THE WALLS OF A BOREHOLE USING A VIDEO CAMERA

BACKGROUND OF THE INVENTION

This invention relates to a borehole camera monitoring system.

It is known to use a camera for examining the walls of a borehole to detect rock fractures. One such apparatus is disclosed in U.S. Pat. No. 4,855,820 granted Aug. 8, 1989. The apparatus comprises a video camera which is lowered into a borehole by means of a cable and a video monitor in conjunction with a video cassette recorder located above ground for visualizing and recording the wall of the borehole. However, with such an apparatus, too much time is being spent reviewing video tapes to detect an orient the rock fractures. Furthermore, the system is heavy to handle due mainly to the weight of the cable interconnecting the camera to the video monitor above ground because the cable contains a large number of electrical conductors.

SUMMARY OF THE INVENTION

It is the object of the invention to provide a borehole camera monitoring system which is portable and use a light coaxial cable for interconnecting the camera to the video monitor above ground.

It is also an object of the present to provide a system wherein logging of the borehole is done using a computer which allows live detection and orientation of the rock fractures and graphic representation of such fractures on a stereonet pole plot.

It is a further object of the present invention to provide a system wherein a frame grabber is used to store still pictures on a floppy disc to allow easy presentation and storage of data.

The borehole camera monitoring system, in accordance with the present invention, comprises generally a camera head assembly adapted to be lowered into a borehole by means of a cable and a control unit located above ground for generating a control signal for the operation of the camera. The camera head assembly comprises a fixed portion and a rotary portion containing the camera and associated equipment for examining the wall of the borehole. The fixed portion of the camera head assembly comprises a micro-controller for controlling the operation of the camera, a position encoder for detecting the angular rotation of the camera with respect to the fixed portion of the camera head assembly and a communication interface including means for multiplexing the video signal generated by the camera with an information signal generated by the micro-controller for transmission over the cable and means for extracting the control signal generated by the computer and transmitted over the cable. The control unit comprises, in addition to the above mentioned computer, a video monitor and a communication interface including means for extracting from the signal transmitted over the cable the video signal for the video monitor and the information signal for the computer and means for multiplexing the control signal of the computer for transmission over the cable. A depth counter is connected to the computer for detecting the depth of the camera head assembly from the upper edge of the borehole.

The means for multiplexing the video signal with the information signal generated by the micro-controller includes a modulator for generating a carrier signal for supporting the information signal generated by the micro-controller and a mixer for mixing the carrier signal with the video signal.

The means for multiplexing the control signal comprises a modulator for generating a carrier signal for supporting the control signal generated by the computer and a mixer for multiplexing the carrier signal with the multiplexed signal already transmitted over the cable.

The control unit further comprises a programmable video image processor connected to the computer for converting the video signal into a signal which may be stored into the memory of the computer or on a floppy disk.

The control unit further comprises means for transmitting power to the camera over the cable.

An orientation device, such as a gyroscope, may be used for compensating for any torsion of the cable supporting the camera head assembly.

BRIEF DESCRIPTION OF THE DRAWINGS

The invention will now be disclosed, by way of example, with reference to the accompanying drawings in which.

DESCRIPTION OF THE PREFERRED EMBODIMENT

Figure 1:
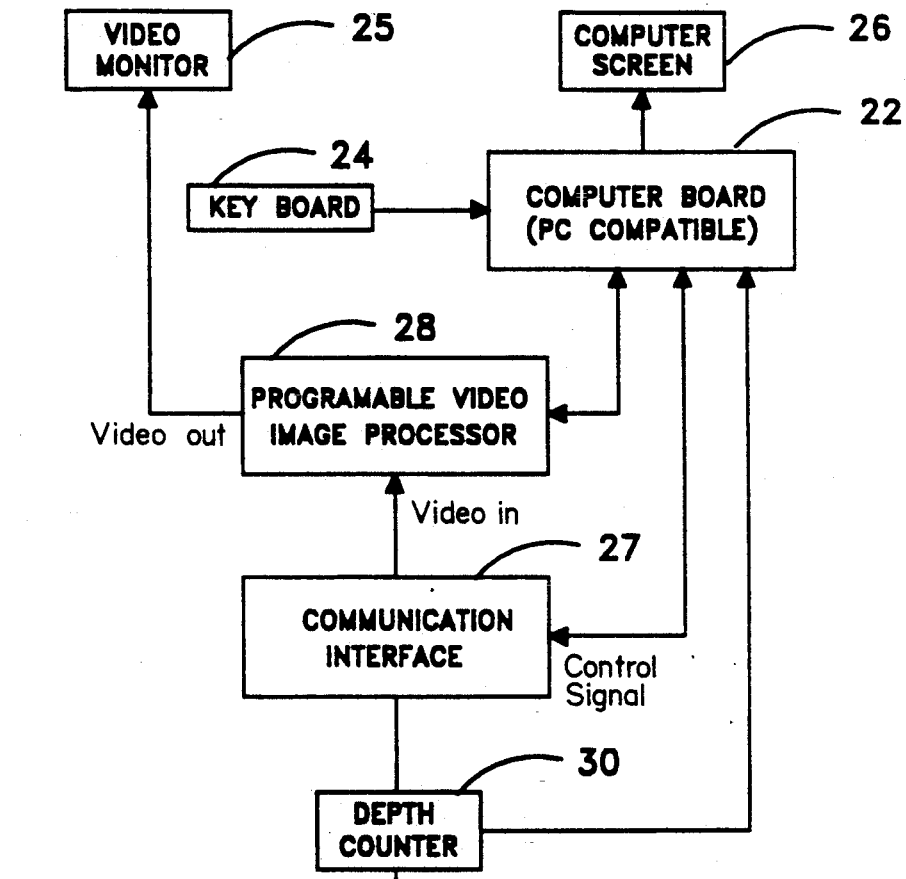
FIG. 1 is a block diagram of the borehole monitoring system in accordance with the present invention.
Figure 1:
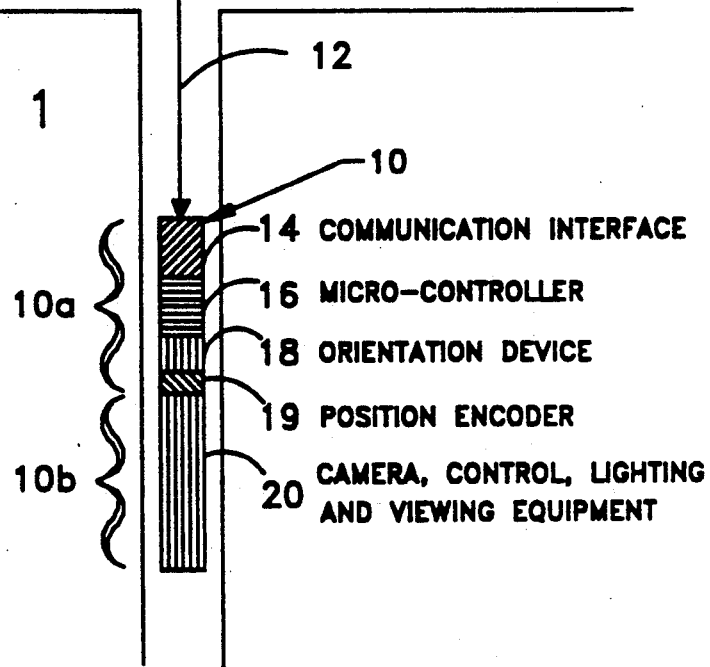

Referring to FIG. 1 of the drawings, the monitoring system comprises a camera head assembly 10 adapted to be lowered into a borehole by means of a regular coaxial cable 12 which is reinforced with a Kevlar cord. The camera head assembly is made of a top portion 10a which is rigidly fixed to the cable and a bottom portion 10b which is rotatably mounted to the top portion. The top portion of the camera head assembly contains a communication interface 14, a micro-controller 16, an orientation device 18 and a position encoder 19 to be more fully disclosed later. The bottom portion contains the camera and associated control, lighting and viewing equipment 20. Located above ground is a control unit including a computer 22 and associated keyboard 24 and screen 26. The computer may be a Little Board AT286 having a 16 MHz-CPU and a 4Mb random access memory. The computer controls communication between a regular video monitor 25 and the camera head assembly 10 through a communication interface 27 which will be disclosed more fully in FIG. 3 of the drawings. A programable video image processor 28, conventionally known as a frame grabber, is used to transform the video images taken by the camera into digital form and store them in the computer memory and/or on floppy discs to allow easy presentation on other computers. A suitable image processor may be a Matrox PIP-512B. A depth counter 30 such as a wheel in contact with the cable may be used for providing a digital signal to the computer to measure the length of cable paid off and thus the position of the camera from the upper edge of the borehole.

Figure 2:
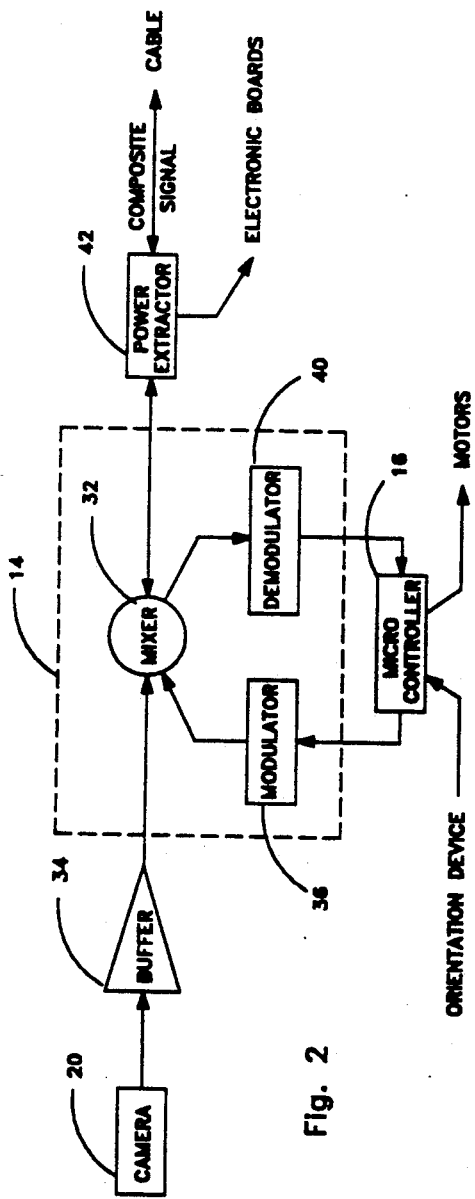
FIG. 2 is a block diagram of the communication interface of the camera head assembly.

Referring to FIG. 2 of the drawings, a video signal in the frequency band of, for example, 0–5 MHz originating from the camera 20 is fed to a mixer 32 through a suitable buffer amplifier 34. The video signal is multiplexed with a carrier signal of a frequency outside the video band, for example, 7 MHz generated by a modulator 36 under the control of the micro-controller 16. The signal transmitted over the cable also includes a control signal originating from the computer and transmitted through the communication interface 27 of the control unit. As it will be seen later in the description of FIG. 3 of the drawings such signal is modulated by a carrier signal of a frequency different from the above frequencies, say 8 MHz. The signal transmitted over the cable is thus a composite signal containing the video signal and two communication signals. The frequency spectrum of an example of the composite signal is shown in FIG. 4 of the drawings. The 8 MHz component of the composite signal is extracted from the composite signal by means of demodulator 40 to produce the control signals which are fed to micro-controller 16 for distribution to the various motors operating the iris, focus and rotation of the camera as well as the viewing equipment. As it will be seen in the description of FIG. 3 of the drawings, electrical power for operating the various components of the camera head assembly is also transmitted through a separate conductor forming part of the cable or multiplexed with the composite signal. Such signal is extracted by a suitable power extractor 42 and fed to the various electronic boards of the equipment.

Figure 3:
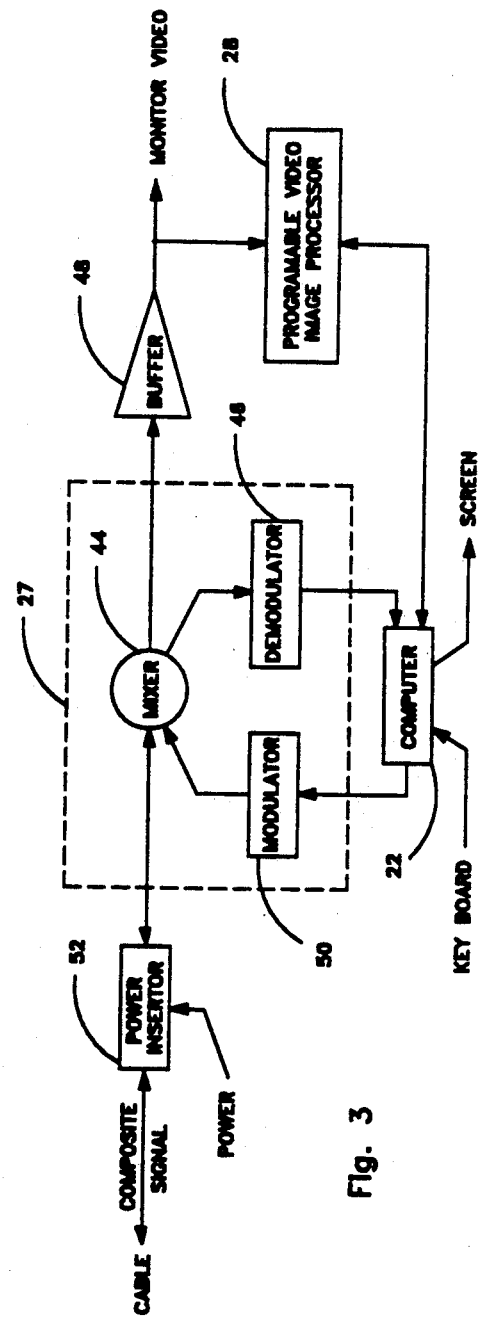
FIG. 3 is a block diagram of the communication interface of the control unit.
Figure 4:
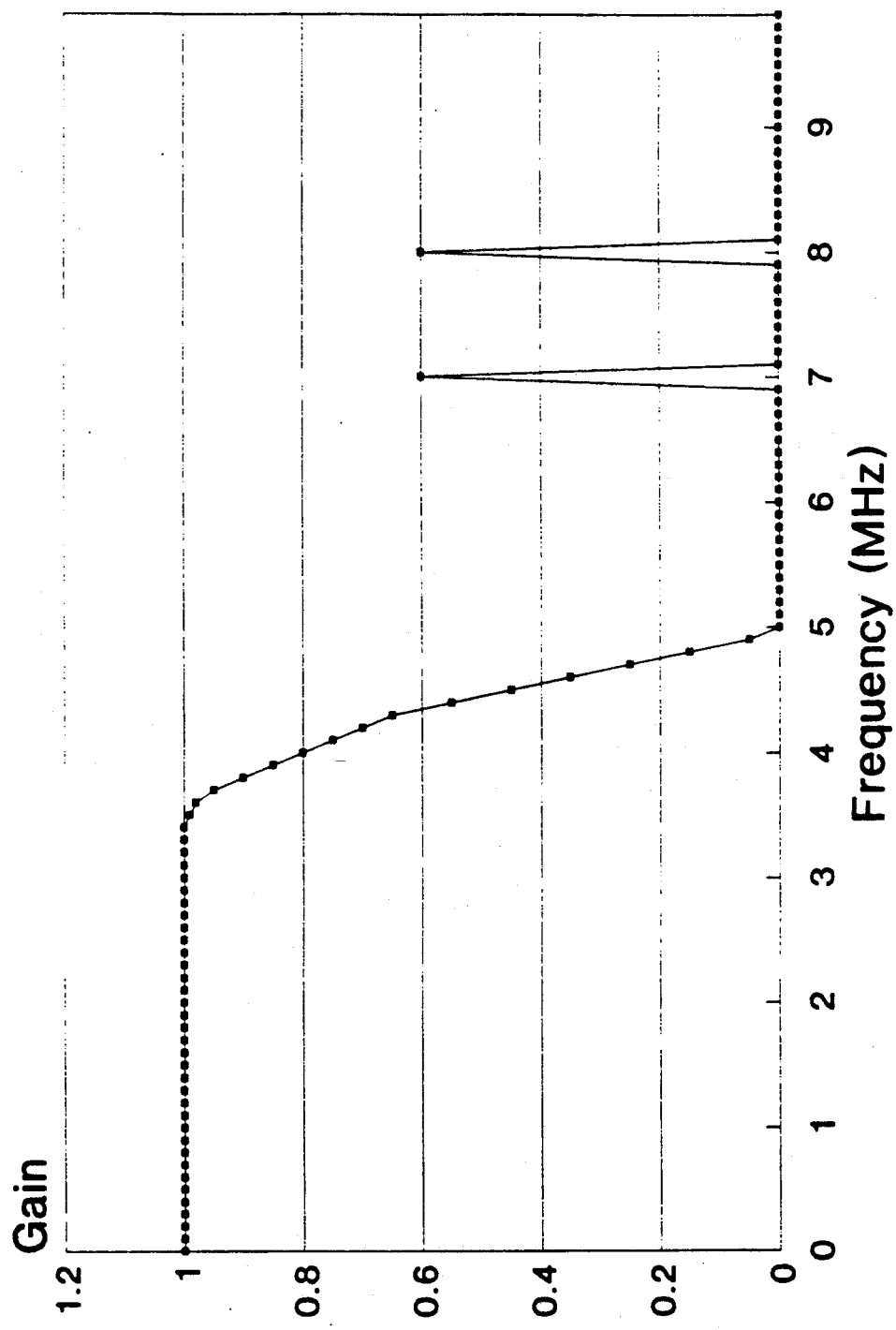
FIG. 4 shows an example of the frequency spectrum of the composite signal sent over the cable.

Referring to FIG. 3 of the drawings, the composite signal received over the cable is fed to a mixer 44 forming part of the communication interface 27. The 7 MHz communication signal is extracted from the composite signal by a demodulator 46 and sent to the computer whereas the video signal is sent to the video monitor through a buffer amplifier 48. The video signal is also sent to a programmable video image processor for transformation into a digital form for storing in the memory of the computer and/or in floppy discs. A modulator 50 generates a communication signal having a carrier frequency of 8 MHz, as mentioned previously, for transmitting the control signals of the computer to the micro-controller of the camera over the cable. A power inserter 52 is used to transmit power to the camera and associated equipment over the cable. The power may be sent through a separate conductor or multiplexed with the composite signal over the cable.

Figure 5:
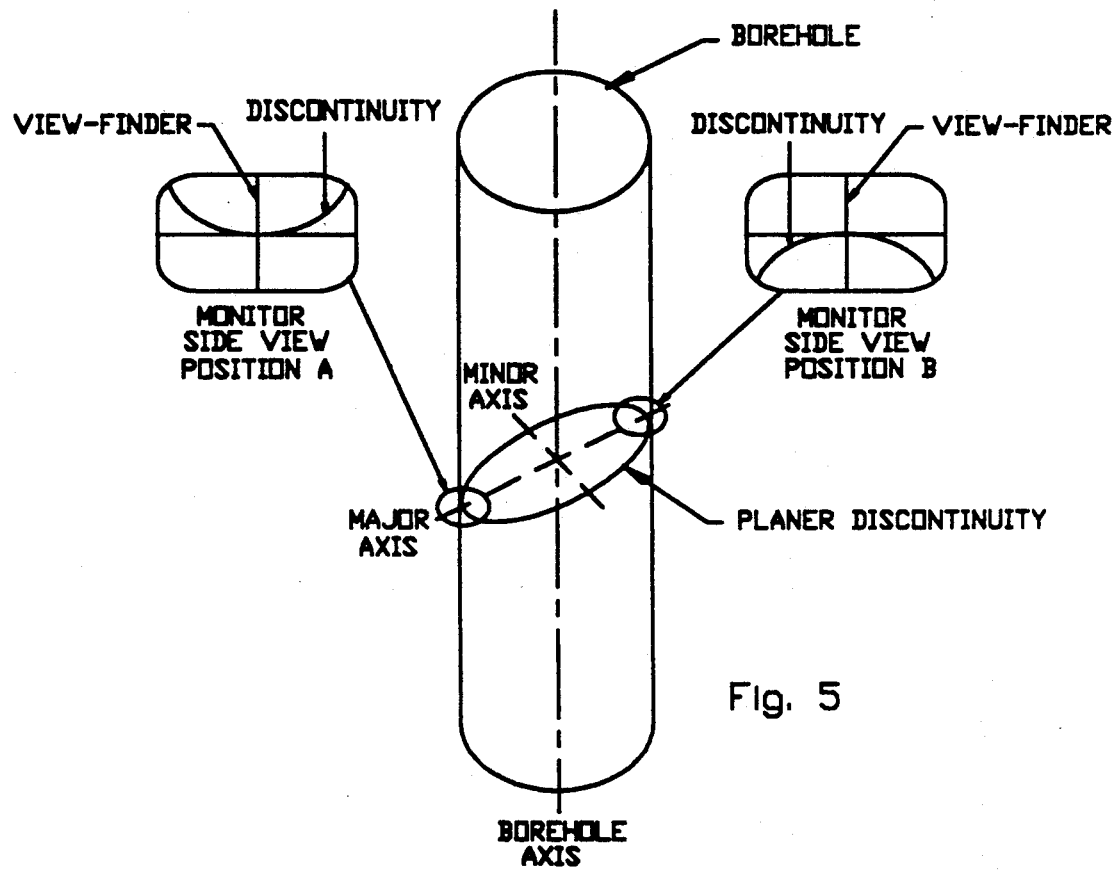
FIG. 5 is a view showing how the orientation of the fracture is determined.
Figure 6:
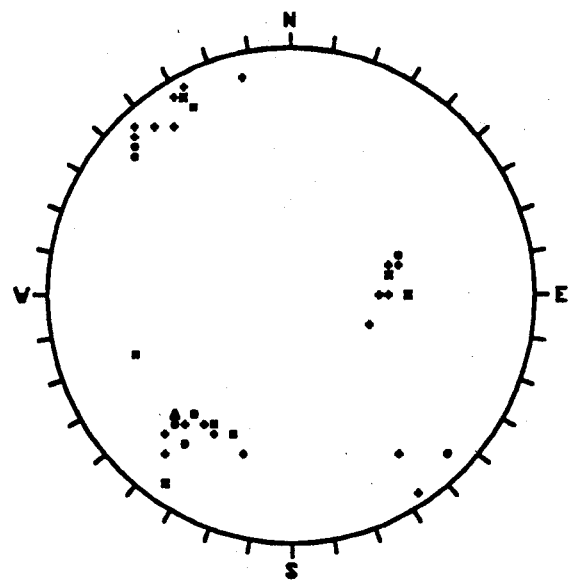
FIG. 6 is a view showing stereonet illustrating fractures in the wall of the borehole.

The computer is programmed for using some of the function keys F1–F9 of the regular keyboard to control the operation of the various motors of the camera head assembly to adjust the iris, focus and rotation of the camera as well as the selection of the front or side lights and control of the lighting intensity. The computer is also programmed so that upon request of the operator, the distance of the fractures from the edge of the borehole and the orientation of such fractures may be determined. To orient a fracture passing through a borehole, it is sufficient to locate on the monitor the two extreme positions A and B on the major axis of the fracture on the wall as shown in FIG. 5 of the drawings. Upon a suitable command from one of the function keys, the operator can request the computer to memorize such positions and the angle of rotation of the camera with respect to the fixed portion of the camera head assembly as determined by position encoder 19. Such angle of rotation is compensated for any torsion of the cable supporting the camera head assembly by means of the orientation device 18. From these data, the computer will calculate the coordinates of the fracture with respect to the axis of the borehole. Knowing the coordinates of the borehole previously entered into its memory the computer will calculate the real coordinates of the fracture and show them on the screen in the form of a stereonet as shown in FIG. 6 of the drawings. The output files of the computer are compatible with the program DIPS developed by the University of Toronto.

Although the invention has been disclosed, by way of example, with reference to a preferred embodiment illustrated in the drawings, it is to be understood that it is not limited to such embodiment and that other alternatives are also envisaged within the scope of the following claims.

What is claimed is:

1. A borehole camera monitoring system comprising:
   a) a camera head assembly adapted to be lowered into a borehole by means of a cable and including a fixed portion and a rotary portion containing a video camera, said fixed portion containing a micro-controller for controlling the operation of the camera, a position encoder for measuring the angular rotation of the camera with respect to the fixed portion of camera head assembly and communication interface including means for multiplexing the video signal from the camera with an information signal generated by the micro-controller for transmission over the cable and mean for extracting a control signal transmitted over the cable for controlling the operation of the camera;
   b) a control unit located above ground and including a video monitor, a computer for generating said control signal, and a communication interface including means for extracting from the signal transmitted over the cable the video signal for the video monitor and the information signal for the computer and means for multiplexing the control signal generated by the computer for transmission over the cable; and
   c) a depth counter connected to the computer for detecting the depth of the camera from the upper edge of the borehole.

2. A borehole camera monitoring system as defined in claim 1, wherein said means for multiplexing said video signal with said first communication signal includes a modulator for generating a carrier signal for supporting the information signal generated by said micro-controller and a mixer for mixing said carrier signal with said video signal.

3. A borehole camera monitoring system as defined in claim 1, wherein said means for multiplexing said control signal comprises a modulator for generating a carrier frequency for supporting the control signal generated by said computer and a means for multiplexing said carrier signal with the multiplexed signal already transmitted over the cable.

4. A borehole camera monitoring system as defined in claim 1, further comprising a programmable video image processor connected to said computer for converting said video signal into a signal which may be stored into the memory of the computer.

5. A borehole camera monitoring system as defined in claim 1, further comprising means for transmitting power to said camera over said cable.

6. A borehole camera monitoring system as defined in claim 1, wherein said camera head assembly further comprises an orientation device for compensating for the torsion of the cable supporting the camera head assembly.

* * * * *